UNITED STATES PATENT OFFICE.

MATIAS CHILA, OF WHITING, INDIANA.

SAUCE-POWDER.

1,166,887.      Specification of Letters Patent.      Patented Jan. 4, 1916.

No Drawing.      Application filed March 12, 1915. Serial No. 13,933.

*To all whom it may concern:*

Be it known that I, MATIAS CHILA, a subject of the King of Hungary, residing at Whiting, in the county of Lake and State of Indiana, have invented new and useful Improvements in Sauce-Powders, of which the following is a specification.

My invention relates to a sauce powder and has as its principal object to provide an article of manufacture of this character which may either be strewn in its original form or cooked in water and applied as a sauce on meats, rendering them tender and palatable.

A further object of my invention is to produce a powder of the character described which has a salutary effect against nervous head-ache and similar affections.

The powder is made of the stalk or halm of the garlic plant in the following manner: The stalks are first naturally seasoned or dried in the air and then hung on a string or wire over a heated plate such as the top of a stove or the like. When they are thus thoroughly dried, they are ground or crushed into powder and the latter then used as aforesaid.

I claim:

The process of making a seasoning powder which comprises subjecting garlic stalks to air drying, raising the temperature artificially until the stalks are thoroughly dried allowing the vapors to escape and then grinding to a fine powder.

MATIAS CHILA.

Witnesses:
    CHAS. D. GAINER,
    J. HUSKOVICH.